Aug. 28, 1962 W. W. B. SCHUMACHER 3,051,833
X-RAY SPECTROMETER
Filed March 30, 1959 9 Sheets-Sheet 5

Wilhelm W.B. Schumacher
Inventor
by:

United States Patent Office 3,051,833
Patented Aug. 28, 1962

3,051,833
X-RAY SPECTROMETER
Wilhelm W. B. Schumacher, Scarborough, Ontario, Canada, assignor to Ontario Research Foundation, Toronto, Ontario, Canada
Filed Mar. 30, 1959, Ser. No. 802,758
22 Claims. (Cl. 250—51.5)

This invention relates to an apparatus for spectrometry and in particular to a spectrometer capable of detecting a broad wave lentgh range including X-rays, visible light and ultra-violet rays.

X-ray analysis of solids, liquids and gases in which the substance under examination remains in the atmosphere and the X-rays excited upon bombardment by a stream of electrons pass through a so-called pressure stage stretch and into a vacuum where they may be detected by a conventional radiation detector, are well known. Such method and apparatus is described in my co-pending application Serial No. 506,585, now Patent No. 2,908,821.

The pressure stage stretch as a substitute for a foil window is also known per se the construction operation and advantages of pressure stage stretches being pointed out in my co-pending application No. 386,085. The pressure stage stretch consists essentially of a plurality of aligned aperture plates providing a clear passage from a vacuum to a point of higher gas pressure, generally atmospheric. The spaces defined by adjacent aperture plates define vacuum chambers and are connected to vacuum pumps providing vacuums of degrees varying from a minimum at the exit to a maximum towards the vacuum chamber itself. These vacuums or stages of vacuum prevent the entry of atmospheric or other gases into the vacuum while permitting a clear and unobstructed passage therefrom to atmosphere which passage may be from the order of 0.1 to 1.0 mm. in diameter.

So far as I am aware there is no commercial available spectrometer capable of covering the whole spectral range including X-rays, visible light and ultra-violet rays i.e. the range from 0.1 Angstrom to 150,000 Angstroms (15 microns). This wide range must necessarily be subdivided for detection for a number of reasons. For certain sub-ranges reflection from crystal planes can be employed. In other sub-ranges artificial optical gratings must be employed.

The minimum wave length of 0.1 Angstrom corresponds to the X-radiation excited by the electrons of 125 kev. which is within the range of commercial X-ray units. By way of comparison, the X-radiation of the uranium atom is 0.11 Angstrom. The spectral range from 0.1 Angstrom to 2.5 Angstroms may conveniently and will hereinafter be, designated as range I. This is the range of the so-called hard X-rays which have a short wave length. While it is not necessary to employ a vacuum spectrometer for spectral analysis in this range, any substance to be analyzed may well have spectral lines in other ranges as well and if it is desired to analyze all wave lengths in one operation, it will be necessary to make provision for detection of this range I in the vacuum spectrometer. For spectral dispersion of radiation in this range I a crystal is most commonly and conveniently employed.

The adjacent range from 2.5 Angstroms to 20 Angstroms may and will be hereinafter designated range II. In this range crystals are the usually employed dispersion element and a vacuum spectrometer is required since this radiation is absorbed in atmospheric air.

The range from 20 Angstroms to 1500 Angstroms may and is hereinafter designated range III. It is well known that crystals are not available as diffraction elements in this range and it is necessary to use artificial gratings or so called optical gratings for dispersion and subsequent detection in this range. So far as I am aware no commercial available spectrometer permits analysis throughout the three ranges as defined above. Examples of elements having K radiations in these ranges are lithium which has a K wave length of 240 Angstroms, carbon which has a K wave length of 44.5 Angstroms and aluminium which has a K wave length of 8.3 Angstroms. The L, M and N radiation of the heavier elements also lie in ranges II and III. This radiation is of course of importance since it contains information on the bond of the particular element. The M radiation of chlorine for example is 67.8 Angstroms and the L radiation of potassium is 47 Angstroms.

The range from 1,500 Angstroms to 150,000 Angstroms may and is hereinafter designated range IV. This is past the X-ray range and comprises ultra-violet, visible and infra-red light. Spectral dispersion in this range may be obtained through the use of an optical grating.

In addition to analysis for elements, information in range IV is useful in the analysis of groups of molecules which cannot be detected in ranges I to III. Characteristic emission bands of water vapour are obtained at 62,600 Angstroms and 31,500 Angstroms. The nitrogen molecule $N_2$ shows bands at 7,000 and 9,000 microns, while the $CO_2$ molecule shows one band near 149,000 microns among others and the HCl molecule shows bands near 33,000 to 38,000 microns.

The atomic spectra of the visible range is also useful in analysis of the spectra of gases.

I am aware that spectrometers exist for covering any of the individual ranges mentioned above and that some spectrometers permit examination over two of the ranges. So far as I am aware however there is no spectrometer available which permits detection over the whole range of 0.1 to 150,000 Angstroms nor is there any spectrometer which permits shifting from one range to another without requiring structural changes and subsequent tedious and delicate alignment.

It is the principal object of this invention, therefore, to provide a single spectrometer capable of detecting and analyzing wave lengths within the range of 0.1 to 150,000 Angstroms.

It is another important object of this invention to provide such an apparatus as may readily be switched from one range to another without requiring structural changes, breaking of the vacuum, or extensive alignment.

It is another important object of this invention to provide such apparatus embodied in a compact mechanism in order to keep the vacuum enclosure to a minimum.

It is another important object of this invention to provide such an apparatus wherein the number of precision parts required is small and easily manufactured.

It is a further important object of this invention that the substance to be analyzed, the entrance aperture of the spectrometer and thus the cone of radiation entering the spectrometer be fixed in space.

It is a still further important object of this invention to provide a spectrometer of the focusing type where the intensity of the radiation from a point source may be detected.

These and other advantageous objects will become apparent through a consideration of the following detailed description taken in conjunction with the attached drawings in which.

My invention consists broadly in a provision of a spectrometer comprising a fixed source of radiation, a detector, a plurality of diffraction elements, lying within the available cone of radiation from the source and means for selecting portions of the available cone of radiation to cause such radiation to impinge upon a single selected diffraction element as hereinafter described in detail.

Figure 1:
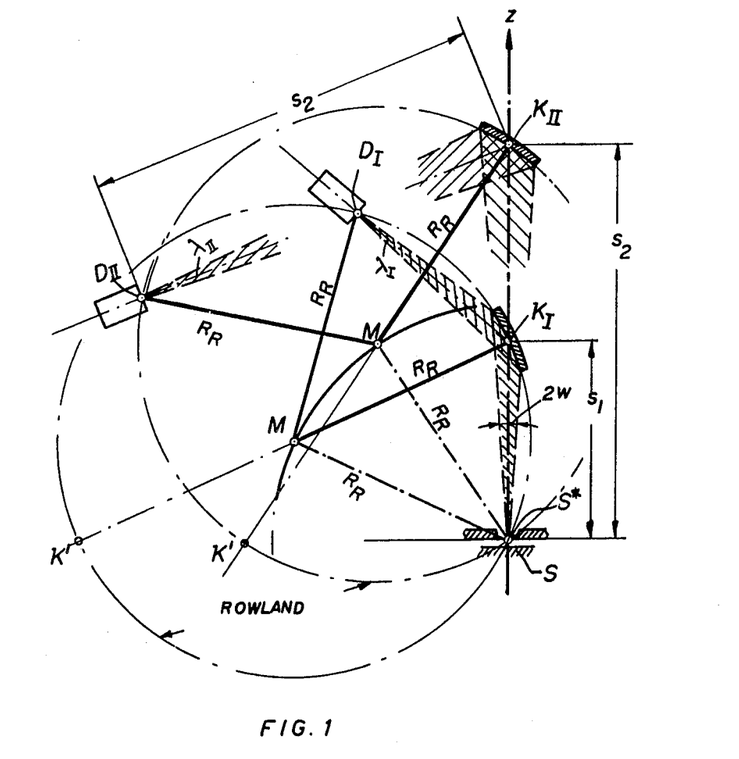
FIGURE 1 is a schematic view showing the kinematics of the spectrometer mechanism.

In greater detail and referring now to the drawings, FIGURE 1 shows the arrangement of the spectrometer components on the so-called Rowland circle where the dispersion agent is a crystal. The selective reflection of a crystal for different wave lengths under different angles of incidence is well known. According to the method of this invention the diffraction crystals are bent in the usual manner K' in FIGURE 1 being the center of curvature of the bending and are ground so that their reflecting surfaces coincide with the circumference of the Rowland circle. S in the drawings is the source of radiation and S* is the entrance aperture of the spectrometer which is situated close to S for reasons which will be obvious. In this specification it will be assumed that the source of radiation S is located in the atmosphere in which case the aperture S* will be the exit aperture of a dynamic pressure stage stretch which provides a passage from a vacuum to the atmosphere in which the radiation source S is located. Z is the axis of the radiation beam from the source S passing through the pressure stage stretch into the vacuum with an angular width of $2w$. K is the centre of the diffraction crystal, D is the entrance slit of the radiation detector all of which are shown both in position I and position II which correspond to a reflected wave length of $\lambda I$ and $\lambda II$ respectively. It is essential in the practice of this invention that S, K, and D be maintained on the Rowland circle having a radius $R_R$. The perpendicular to the crystal surface at the point K passes through the centre M of the Rowland circle and the angles SKM and MKD are equal. If the axis Z is fixed in space as shown in FIGURE 1 then to move the crystal and detector from position I to position II it is necessary to swing the whole Rowland circle about S*. The centre M of the Rowland circle thereby moves on a circle with centre S* and radius $R_R$. During this movement the length of the cords S*K and KD remain equal. This relationship is employed as the basis for the mechanism described hereinafter.

It is well known that the diffraction crystals may be of relatively large size and yet the reflection conditions originally fulfilled for point K also fulfilled for points which have a distance of, say, $0.5R_R$ from K. The following conditions must be fulfilled in order to obtain this reflection from a large crystal:

(a) The crystal must be bent so that the lattice plane passing through K has a radius of curvature of $2R_R$. K' (FIGURE 1) is the centre of curvature for all the lattice planes;

(b) The surface of the crystal must be ground to coincide with the Rowland circle.

The characteristic angle of reflection for any given wave length depends upon the distance $d$ of the lattice planes of the crystal. Thus this invention contemplates the use of composed diffraction crystals with a number of distances $d1$, $d2$, etc. between the lattice planes, thus for a given angle of reflection, each part will reflect its own characteristic wave lengths.

Figure 2:
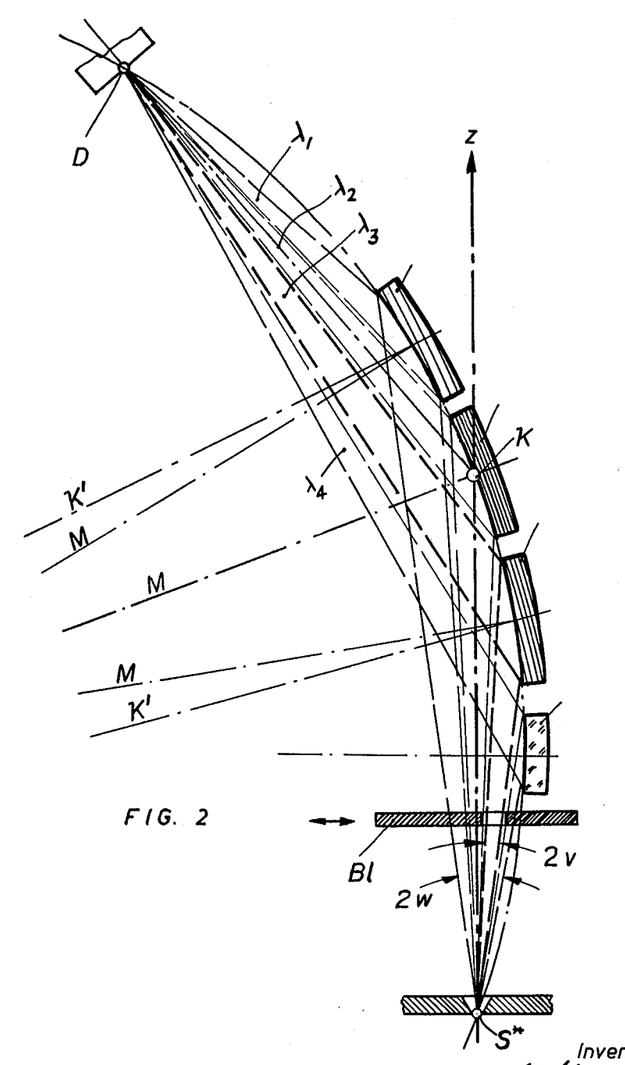
FIGURE 2 is a view similar to FIGURE 1 showing the arrangement of certain parts in greater detail.

FIGURE 2 illustrates how a plurality of varying crystals may be employed all disposed on the Rowland circle and all necessarily disposed within the available cone of radiation from the source S. Each one of the plurality of crystals conforms to the aforementioned conditions (a) and (b).

Figure 3:
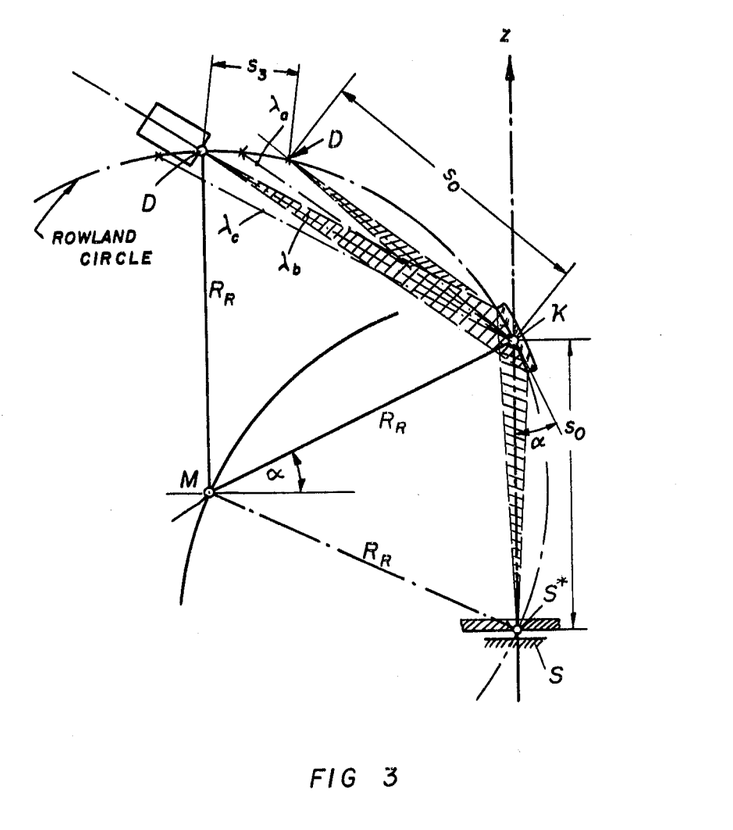
FIGURE 3 is a view similar to FIGURE 1 showing the kinematic system of the invention where a diffraction grating rather than a crystal is used.

In addition to the crystals an optical grating can be employed for wave lengths greater than, say, 20 Angstroms. In this case a cylindrical, concave grating with a radius of $2R_R$ is used fulfilling the same focusing conditions as already described with relation to the crystal. There is however one essential difference. For each position of the grating a complete diffraction spectrum can immediately be obtained not, as with the crystal, only one single wave length. The relationship of the diffraction grating is shown in FIGURE 3. Two modes of operation of the spectrometer are possible when the diffraction grating is employed. In the first case the detector may be moved along the Rowland circle while the diffraction grating is kept fixed at a suitable position along the axis and in the second detector may be located at D' which is shifted an amount $s_3$ compared to the symmetrical position at $D_0$ and the grating thereupon moved up and down the axis A. In this case the angle of incidence changes and thus the wave length at D' changes correspondingly. Apart from the shifting of the detector from $D_0$ to D' this mode of operation is identical with that using a crystal.

The required movement of the detector along the Rowland circle can be accomplished by the construction of the device described hereinafter.

In order to employ one diffraction element at a time, the invention contemplates a selection from the available cone of radiation of only a portion thereof. As shown in FIGURE 2 a slot aperture B1 slidable from left to right as shown in the drawing is disposed across the paths of the X-rays between S* and K. The slot aperture is movable, and from the available cone of rays of $2w$, it selects a partial cone of the smaller angle $2v$ which is just large enough to illuminate one of the crystals with radiation. Any particular spectral range can be selected by employing a given crystal which can in turn be selected merely by shifting the slot B1.

In the preferred form of invention the diffraction grating is located beside the diffraction crystal as shown in FIGURE 2. It is thus located on the Rowland circle and can be switched to radiation by the means of the slot aperture B1. It can be seen from FIGURE 2 that the chosen location of the gating, off point K, is identical in effect with the shifting $s_3$ of the detector as shown in FIGURE 3. Hence, with respect to the grating, the detector in FIGURE 2 is off the symmetrical reflection position and receives a wave length $\lambda 4$ corresponding to $\lambda b$ in FIGURE 3. Thus, the shifting of the slot aperture B1 is the only operation required if a change from the operation with crystals to the operation with gratings is desired. It is also possible to locate several gratings side by side and the aperture B may be composed of two parts in order to vary the width of B to permit reflection from several dispersion elements at the same time if desired.

Figure 4:
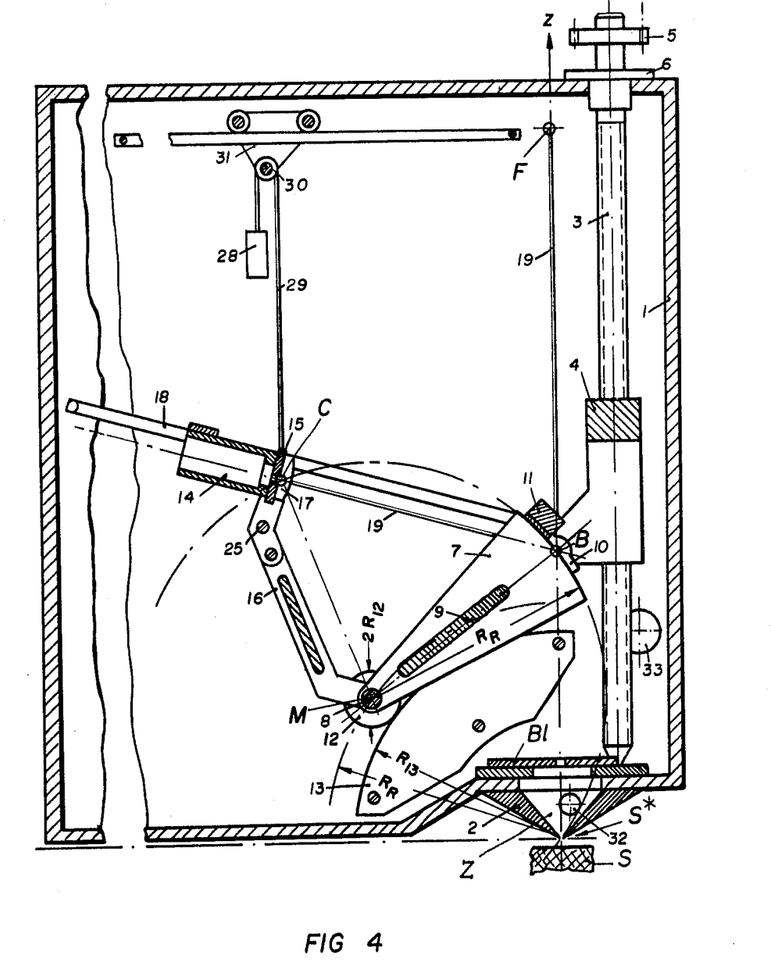
FIGURE 4 is a vertical cross-section partly schematic showing an apparatus constructed so as to embody feature of the invention.

One apparatus by which the inventive concept of the invention may be carried into practice i.e. 1 permitting adjustment of the detector and crystal while preserving their essential relationship on the circumference of the Rowland circle including S*, is illustrated in FIGURE 4 and the following figures. Referring now to FIGURE 4 and the following drawings, S represents a source of radiation of X-rays or light which is sought to be analyzed by spectrometry, S is in the atmosphere. 1 is a vacuum chamber kept evacuated by a vacuum pump connected at 33. A pressure stage stretch indicated generally at 2 provides a passage from the vacuum chamber to the atmosphere at S. The exit aperture of the pressure stage stretch is designated as S* and z is the axis of the radiation eminating from the source and passing through the centre line of the pressure stage stretch 2. 32 is the connection to a vacuum pump providing a vacuum for one of the stages of the pressure stage stretch. B1 is a slidable plate having a central orifice of restricted dimensions. 11 is a diffraction element such as a crystal or optical grating and is one of a plurality of such elements similarly mounted, the others not being shown in FIGURE 4 for purposes of clarity. 14 is the chamber of a radiation detector having a slit plate 15 at its entrance. An axis $y'$ is defined by the centre line of the slit this axis forming the pivot axis for two pivots C which are rigidly secured to the wall of 14. The pivots C permit the chamber 14 to swing in two bearings 17 (see FIGURE 8) located on the end of the lever arm 16, the other end of the lever arm 16 pivots about pivot 8 which is the centre of a cam follower 12 hereinafter described in detail.

The distance between the axis of 8 and the axis of 17 is equal to $R_R$, so that the entrance slit will always swing on the Rowland circle as will also hereinafter be described in detail. The cam follower 12 rides on a circular cam 13 which is fixed in the vacuum chamber 1 having its centre at S* and a radius $R_{13}$ such that the radius described by the centre of pivot 8 is equal to $R_R$. The radius $R_{12}$ of the cam follower 12 is therefore such that $R_{13}$ plus $R_{12}$ equals $R_R$. A rail 18 suspended at B and supported by roller 22 on pivot C (FIGURE 7) maintains the detector in position facing B.

Figure 5:
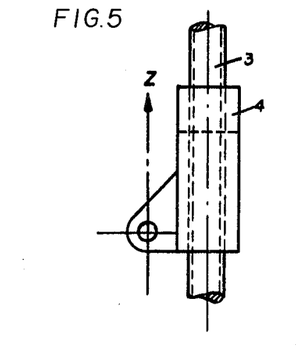
FIGURES 5, 5a and 5b are views showing some of the components of the apparatus shown in FIGURE 4 in three mutually perpendicular views.
Figure 5A:
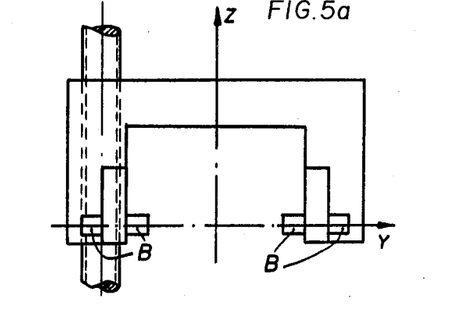
Figure 5B:
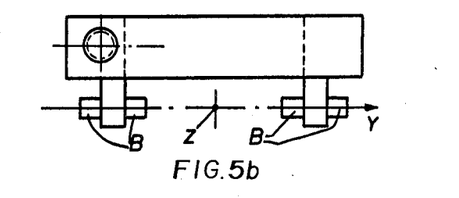
Figure 6:
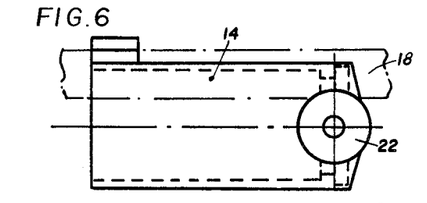
FIGURES 6, 6a and 6b are views showing other components of the apparatus shown in FIGURE 4 in three mutually perpendicular views.
Figure 6A:
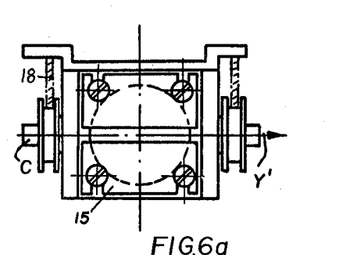
Figure 6B:
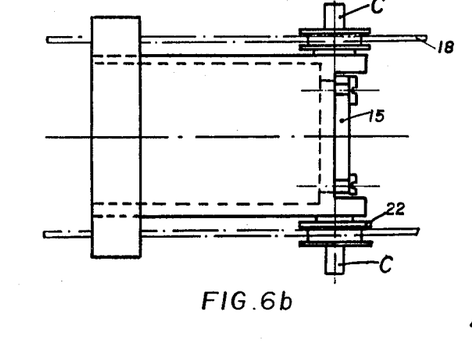

As has already been pointed out, the essential relationship of the parts is that the distances BC and BS* be equal for each and every position of B. In the construction shown in FIGURE 4, this is achieved by using a thin flexible string or chain 19 running from C to B and to a point F where it is fixed. The change of direction at B takes place on the axis $y$ as may be seen with reference to FIGURES 5 and 7. The distance FBC is a constant and FB equals FBS*+BS*, thus FBC+FB=BC and FBS*+FB=BS* as required. The string 19 may be kept under tension by a spring tending to spread the levers 7 and 16.

The crystal or diffraction element 11 and all other diffraction elements required are mounted on the sector 7 which sector is pivoted at one end about 8 and its other end is pivotly secured at B to a slide 4 mounted on the vertically extending lead-screw 3. The slide is internally threaded and the upper end of the screw 3 projects through bearing 6 terminating in a gear or driving wheel 5 whereupon rotation of the wheel 5 causes the slide to move up and down the screw 3 as required.

In order to scan a spectrum using a diffraction crystal the only adjustment required is to move slide 4 up and down by means of the driving wheel 5. This will actuate the whole lever system which as may readily be seen by reference to the drawings will change the angle of incidence of the radiation from the source to the detector while maintaining both the detector entrance aperture and the crystal on the Rowland circle which includes the source.

Figure 7:
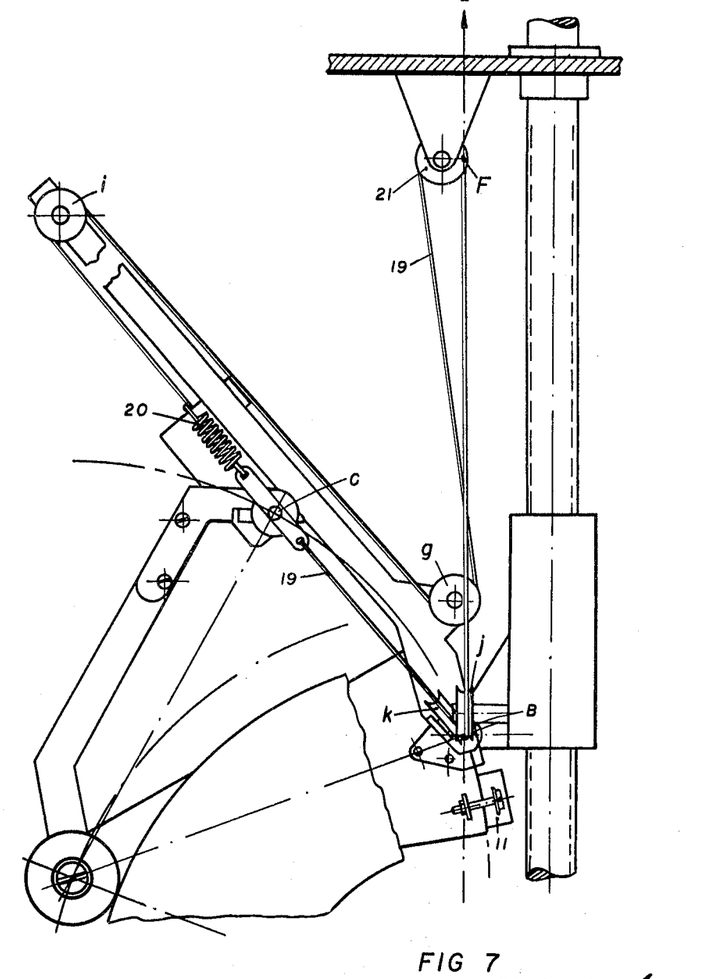
FIGURE 7 is a view of some of the components of the apparatus of FIGURE 4 shown in greater detail.
Figure 8:
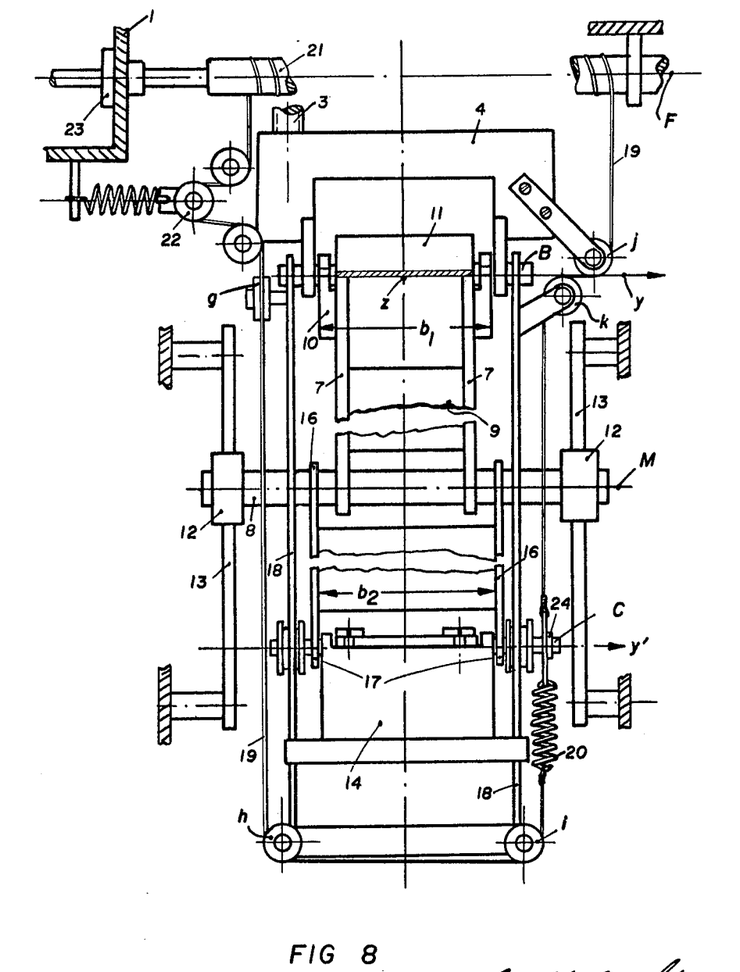
FIGURE 8 is a view similar to FIGURE 4 rotated through 90 degrees.

String 19 may alternatively be kept under tension as shown in FIGURES 7 and 8. In this embodiment the string 19 is coiled around a spindle 21 at point F and returns over rollers $g$, $h$ and $i$ to C where the spring 20 provides a constant tension. This might equally well be accomplished by an additional loop with a spring loaded roller 22 as shown in FIGURE 8. In this case the spring 20 can be dispensed with.

The geometric requirements of the inventive design are fulfilled only if the change of direction of the string from the direction FB to the direction BC takes place exactly along the axis $y$. This may be accomplished by making the change in direction in two steps. The string leading from F can be led on to the axis $y$ by means of the roller $j$ and then by means of the roller $k$ led from the axis $y$ and directed to C as may be seen by reference to FIGURE 8. $j$ is fixed at 4 and $k$ at 18. The return is accomplished by means of the single roller $g$. This design, using an endless string, permits adjustment of BC independently of the position B simply by turning the spindle 21. Adjustment of the equality of S*B and BC may thus conveniently be accomplished by a single adjustment.

In order to scan a spectrum obtained from a diffraction grating mounted at K according to FIGURE 3 the only adjustment required is to turn spindle 21 resulting in a movement of the detector only along the Rowland circle. Spindle 21 leaves the vacuum box 1 through a vacuum type bearing 23.

FIGURE 8 shows the mechanical system of the spectrometer partly schematically and viewed from the top. In this figure, both ends of the string 19 are fixed to a bracket which holds a bearing 24 slipped over the pivot C and readily detachable therefrom if necessary to exchange the chamber of the radiation detector. If the chamber 14 is changed the string 19 remains unchanged and no new adjustment is required. The bearings 17 of lever 16 located on the axis $y'$ are split bearings so that chamber 14 may readily be removed. Clearance $b_2$ of the lever 16 is larger than the width $b_1$ of the circular sector 7 including the pair of bearings 10. The lever 16 is curved (see FIGURE 4) so that it may fold completely over 7 in which case the axes $y$ and $y'$ coincide if the length of the lever 16 is correct. This length is adjustable by means of the screws 25. Thus the length of the lever 16 may be adjusted to be equal to the radius $R_R$ of the sector 7 without necessitating the use of any external measuring devices. This adjustment merely requires pushing an axial pin through the bearings for B and C after loosening screws 25 and subsequently retightening screws 25 in the proper position and removing the axial pin.

Figure 9:
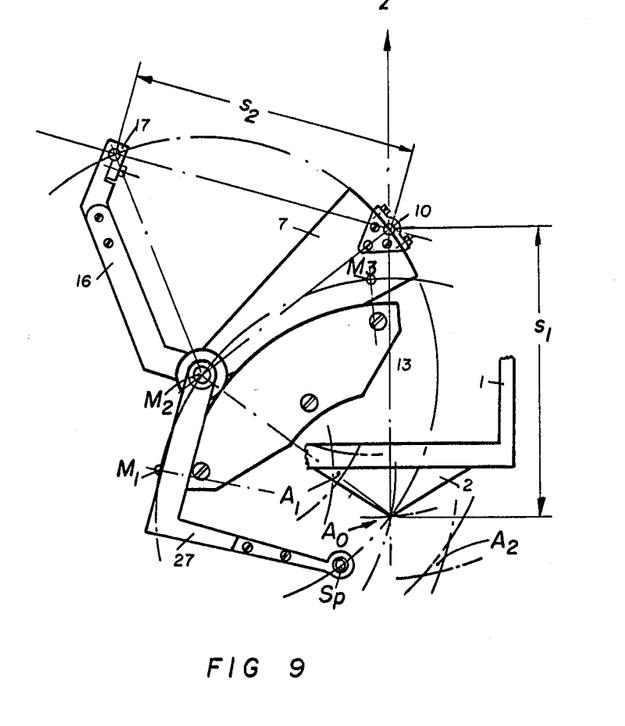
FIGURE 9 is a detail of the apparatus of FIGURE 4.

An auxiliary lever 27 shown in FIGURE 9 may be attached to the pivot 8. The length of this auxiliary lever 27 may be adjusted to be equal to $R_R$ in the same manner that the length of the lever 16 is adjusted. The purpose of this auxiliary lever may be understood by reference to FIGURE 9. The point $Sp$ on the auxiliary lever 27 is distant $R_R$ from the centre of the pivot 8, thus point $Sp$ circumscribes a circle which is the Rowland circle. S* must lie on this circle. The auxiliary lever 27 is curved so that it reaches over the vacuum box 1 in such a manner that the point $Sp$ may touch the entrance aperture S* provided all the parts, and in particular the cam 13 are properly adjusted with respect to the entrance aperture. In addition this auxiliary lever may be used to check the relationship $R_{12}+R_{13}=R_R$. If this condition is fulfilled and if we choose the three centre points $M_1$, $M_2$ and $M_3$ then the point $Sp$ circumscribes a system of circles designated $A_0$ in FIGURE 9. If however $R_{12}+R_{13}$ is larger than or less than $R_R$, the system of circles designated by $A_1$ and $A_2$ is produced from which the necessary corrections may readily be determined. Correction may be made by replacing roller 12.

The manner in which the embodiments shown in FIGURE 4 carries out the inventive concept of the invention will now readily be apparent. The radius $R_R$ of the sector 7 on which the diffraction elements are mounted is fixed. The length of the lever 16 and of the auxiliary lever 27 are adjusted by folding 16 and 27 over 7 and by inserting an axial pin through B, C and $Sp$. The proper diameter of the rollers 12 can be determined from the system of circles $A_0$, $A_1$ and $A_2$. The length of the cord $S_1$ can be determined and set by the driving wheel and the length of the cord $S_2$ is determined by the string or chain. $S_1$ and $S_2$ may be equal or different and may be changed together or independently. A diffraction grating or crystal may be placed at any arbitrarily chosen spot of the sectors 7.

In order to avoid a change of load on the string 19 a counter weight 28 shown in FIGURE 4 may be provided suspended on the spring 29 balancing the weight of parts 14, 15, 16 and 17 at least partially. The roller 30 is supported by a roller slide 31 which follows the movement of C in order to keep 29 vertical. Parts 29 to 31 may of course be dispensed with if less stringent accuracy requirments are involved.

The slot aperture B1 is used to define the chamber Z which is one stage in the pressure stage stretch. The slot aperture B1 acts as a throttle for gas flow into the spectrometer and the flow through B1 with angular aperture of $2v$ is less than the flow to be expected were Z to have an aperture with an angular $2w$ (see FIGURE 2). The use of slot B1 as a movable aperture to select radiation and as a throttle for the gas flow permits the use of smaller vacuum pumps for the spectrometer.

Figure 10:
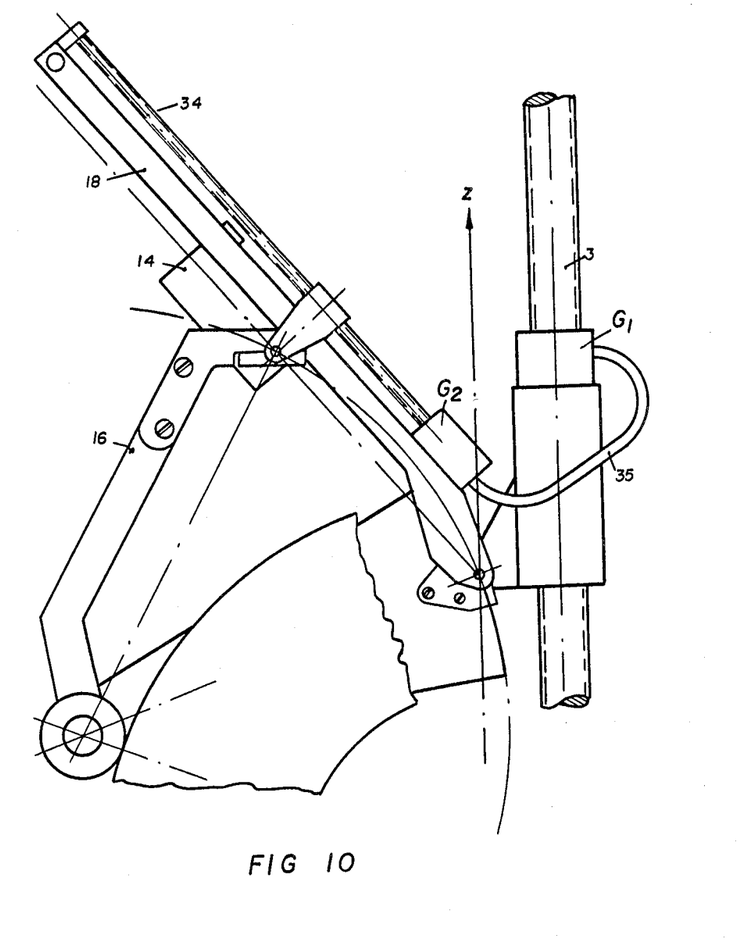
FIGURE 10 is a further detail of a modification of the apparatus shown in FIGURE 4.

It will be appreciated that the use of a string or chain is not the only possibility for keeping the cords $S_1$ and $S_2$ in the proper relationship when slide 4 is moved. Another solution lies in having a lead screw 34 (see FIGURE 10) affixed on the rail 18 and having the chamber 14 and the lever 16 movable by this lead screw. The screw 34 is driven by gears $G_1$ and $G_2$ and a flexible link 35 with revolutions proportional to the revolutions of the screw 3. It is advantageous to use differential gears for $G_1$ and $G_2$ to permit driving of the screw 34 independently. The flexible link 35 may consist of rigid axles with universal joints or may consist of a flexible shaft.

The invention has been described with reference to the preferred embodiments and to precise constructional details. It is to be understood however that the invention should not be construed as limited to such details and embodiments. Obvious modifications in extension and design will occur to those skilled in the art without departing from the inventive steps of the invention. Thus such embodiments of the invention as come within the scope and purview of the appended claims are to be considered as part of this invention.

What I claim as my invention is:

1. A spectrometer comprising a fixed entrance aperture through which a beam of radiation is adapted to pass, a plurality of diffraction elements adapted to diffract radiation of differing wavelengths, a plurality of said diffraction elements being diffraction crystals each having a different lattice spacing, a detector for diffracted radiation, said fixed entrance aperture, diffraction elements and detector being located on a common Rowland circle, said diffraction elements being located within the available beam of radiation passing through said fixed entrance aperture, means for moving said diffraction elements in said available beam of radiation away from and towards said fixed entrance aperture to rotate said Rowland circle about said entrance aperture, said entrance aperture thereby being maintained on said Rowland circle, means automatically maintaining said diffraction elements and said detector on said Rowland circle while said diffraction elements are moving in said available beam of radiation, and restricting means restricting said available beam of radiation to a smaller effective beam of radiation striking only a limited number of the diffraction elements at any one observation time.

2. A spectrometer according to claim 1 wherein at least one of said diffraction elements is a diffraction grating, said diffraction elements being selected to permit detection of adjacent and overlapping ranges of wavelengths by said detector.

3. A spectrometer according to claim 2 wherein said crystals are bent to a radius equal to the diameter of said Rowland circle, and the reflecting surface of said grating is concave and has a radius of curvature equal to the diameter of said Rowland circle.

4. A spectrometer according to claim 3 wherein the reflecting faces of said crystals are shaped to coincide with the circumference of said Rowland circle.

5. A spectrometer according to claim 1 wherein said restricting means comprises a slidable plate having an aperture of restricted size therein, said aperture being adapted to permit passage therethrough of only a portion of said available beam of radiation.

6. A spectrometer as claimed in claim 1 including means automatically maintaining the distances between said diffraction elements and said fixed entrance aperture and between said diffraction elements and said detector at least substantially equal to one another while said diffraction elements are moving in said available beam of radiation.

7. A spectrometer as claimed in claim 6 including means for positioning said detector at any desired distance on said Rowland circle from said diffraction elements.

8. A spectrometer as claimed in claim 1 wherein said detector and diffraction elements are located in a vacuum chamber.

9. A spectrometer for light and X-rays comprising a vacuum chamber, a fixed entrance aperture through which a beam of radiation is adapted to pass into said chamber, a plurality of diffraction elements adapted to diffract radiation of differing wavelengths, a plurality of said diffraction elements being diffraction crystals each having a different lattice spacing, said diffraction elements being positioned in said vacuum chamber and including at least one diffraction grating, a detector for diffracted radiation positioned in said vacuum chamber, said fixed entrance aperture, diffraction elements and detector being located on a common Rowland circle, said diffraction elements being located within the available beam of radiation passing through said fixed entrance aperture, means for moving said diffraction elements in said available beam of radiation away from and towards said fixed entrance aperture to rotate said Rowland circle about said entrance aperture, said aperture thereby being maintained on said Rowland circle, means maintaining said diffraction elements and said detector on said Rowland circle while said diffraction elements are moving in said available beam of radiation, and restricting means restricting said available beam of radiation to a smaller effective beam of radiation striking only a limited number of the diffraction elements at any one observation time.

10. A spectrometer according to claim 9 wherein said diffraction elements are selected to permit detection of adjacent and overlapping ranges of wavelengths by said detector.

11. A spectrometer according to claim 10 wherein said crystals are bent to a radius equal to the diameter of said Rowland circle, and the reflecting surface of said grating is concave and has a radius of curvature equal to the diameter of said Rowland circle.

12. A spectrometer according to claim 11 wherein the reflecting faces of said crystals are shaped to coincide with the circumference of said Rowland circle.

13. A spectrometer as claimed in claim 12 wherein said restricting means comprises a slidable plate having an aperture of restricted size therein, said aperture being adapted to permit passage therethrough of only a portion of said available beam of radiation.

14. A spectrometer as claimed in claim 9 wherein said fixed entrance aperture is defined by a pressure stage stretch providing a passage through a wall of said vacuum chamber.

15. A spectrometer as claimed in claim 12 wherein said diffraction elements are adapted to diffract radiation having a wavelength between about 0.1 and 150,000 A.

16. A spectrometer as claimed in claim 9 including means automatically maintaining the distances between said diffraction elements and said fixed entrance aperture and between said diffraction elements and said detector at least substantially equal to one another while said diffraction elements are moving in said available beam of radiation.

17. A spectrometer as claimed in claim 16 including means for positioning said detector at any desired distance on said Rowland circle from said diffraction elements.

18. A spectrometer mechanism for maintaining a fixed entrance aperture adapted to permit passage of a beam of radiation therethrough, at least one diffraction element and a radiation detector for diffracted radiation in proper mutual position on a Rowland circle of radius $R_R$ while the symmetry centre of said diffraction element travels in at least substantially a straight line towards and away from said fixed entrance aperture and in said beam of radiation, said mechanism comprising a circular cam having a radius $R_1$ and a centre point at said fixed entrance aperture, a follower adapted to move on said cam, said follower having a pivot point adapted to describe a circle of radius $R_R$ with centre at said fixed entrance aperture, a first lever pivotally mounted on said follower at said pivot point and carrying said diffraction element pivotally mounted at a radius $R_R$ from said pivot point, and a second lever pivotally mounted on said follower at said pivot point, said detector being pivotally mounted on said second lever at a distance $R_R$ from said pivot point.

19. A spectrometer mechanism according to claim 18 including means for positioning said detector at any desired distance on said Rowland circle from said diffraction element.

20. A spectrometer mechanism according to claim 19 wherein said follower is a roller of radius $R_2$, said pivot point is at the centre of said roller and $R_1+R_2=R_R$.

21. A spectrometer mechanism according to claim 20 including a plurality of spaced apart diffraction elements carried by said first lever at a radius $R_R$ from said pivot point, at least one of said diffraction elements being a diffraction crystal, at least one of said diffraction elements being a diffraction grating, the reflecting faces of each of said diffracting crystals being shaped to coincide with said Rowland circle and including means maintaining the distance between said diffraction elements and said detector at least substantially equal to one another while said diffraction elements are moving in said available beam of radiation.

22. A spectrometer comprising a fixed entrance aperture through which a beam of radiation is adapted to pass, a plurality of diffraction elements adapted to diffract radiation of differing wavelengths, a plurality of said diffraction elements being diffraction crystals each having a different lattice spacing, a detector for diffracted radiation, said fixed entrance aperture, diffraction elements and detector being located on a common Rowland circle, said diffraction elements being located within the available beam of radiation passing through said fixed entrance aperture, means for moving said diffraction elements in said available beam of radiation away from and towards said fixed entrance aperture, means maintaining said fixed entrance aperture, diffraction elements and detector on said Rowland circle while said diffraction elements are moving in said available beam of radiation, and restricting means restricting said available beam of radiation to a smaller effective beam of radiation striking only a limited number of the diffraction elements at any one observation time.

References Cited in the file of this patent

UNITED STATES PATENTS

| | | |
|---|---|---|
| 1,993,058 | Hahn | Mar. 5, 1935 |
| 2,640,948 | Burrill | June 2, 1953 |
| 2,666,147 | Borst | Jan. 12, 1954 |
| 2,688,094 | Dumond | Aug. 31, 1954 |
| 2,805,341 | Lang | Sept. 3, 1957 |
| 2,835,820 | Birks | May 20, 1958 |
| 2,941,443 | McNalley | June 21, 1960 |
| 2,980,798 | Romand et al. | Apr. 18, 1961 |
| 2,999,931 | Zingaro | Sept. 12, 1961 |

FOREIGN PATENTS

| | | |
|---|---|---|
| 785,845 | Great Britain | Nov. 6, 1957 |